United States Patent [19]
Barton, Jr. et al.

[11] 3,843,881
[45] Oct. 22, 1974

[54] DETECTION OF ELEMENTS BY IRRADIATING MATERIAL AND MEASURING SCATTERED RADIATION AT TWO ENERGY LEVELS

[75] Inventors: Hugh M. Barton, Jr.; Peter R. Gray, both of Bartlesville, Okla.

[73] Assignee: Phillips Petroleum Company, Bartlesville, Okla.

[22] Filed: Jan. 11, 1973

[21] Appl. No.: 322,696

[52] U.S. Cl. ................................................ 250/269
[51] Int. Cl. ................................................ G01t 1/20
[58] Field of Search ............ 250/256, 261, 269, 265

[56] References Cited
UNITED STATES PATENTS
3,453,433   7/1969   Alger et al. ........................ 250/265
3,521,064   7/1970   Moran et al. ....................... 250/261

Primary Examiner—Archie R. Borchelt
Assistant Examiner—Davis L. Willis

[57] ABSTRACT

Metals and other elements are detected in a material by irradiating the material with high energy radiation. Scattered radiation from the material is measured by two pulse height analyzers set at two different energy levels in the region of Compton scattering. The ratio of the measured radiation at the two energy levels is indicative of the presence of the elements.

9 Claims, 4 Drawing Figures

3,843,881

DETECTION OF ELEMENTS BY IRRADIATING MATERIAL AND MEASURING SCATTERED RADIATION AT TWO ENERGY LEVELS

In prospecting for metal ore bodies it is common practice to drill test holes to determine the composition of subterranean formations. Chemical analyses can be made of the cuttings and/or cores to detect the presence of metal ores. However, such a procedure involves laboratory analyses which generally must be conducted at locations remote from the prospecting area. Moreover, such analyses are time consuming and expensive, particularly when it is desirable to detect any of several metal ores which may be present. In order to simplify prospecting methods, it has been proposed to irradiate formations penetrated by a borehole with gamma rays and measure the resulting X-ray fluorescence of metals present in the formations. One such procedure is described in U.S. Pat. No. 3,404,275. As therein disclosed, the formation is irradiated and measurements are made of both Compton scattered radiation and fluorescent K-line radiation of a heavy element present in the formation. However, such a procedure is generally limited to the detection of a single metal at a given time because different metals generate fluorescent K-line radiation of different energies. The equipment must be adjusted each time a different metal ore is to be detected.

In accordance with one embodiment of the present invention, a method is provided for analyzing materials, such as formations intersected by a borehole, to determine the presence of any one of a series of metal ores contained therein. This is accomplished by irradiating the formation with high energy electromagnetic radiation from a suitable source, such as a radioactive material. The radiation source is selected to provide radiation at an energy level higher than the energy level of the K-line radiation emitted by the heaviest metal ore to be detected. The resulting Compton scattered radiation is measured by a suitable detector, such as a scintillation crystal and a photomultiplier. The output signal from the detector is transmitted through two pulse height analyzers which are adjusted to transmit pulses due to radiation at different energy levels in the Compton scattered region. A signal is then established which is representative of the ratio of the count rates of the output signals from the two pulse height analyzers. This ratio signal remains substantially constant in the absence of a metal ore being present in the test material, but changes when a metal ore is present. When a region is encountered which contains one or more metal ores, a detailed X-ray fluorescence analysis can be made to determine the specific metal ore or ores present.

In the accompanying drawing.

Figure 1:
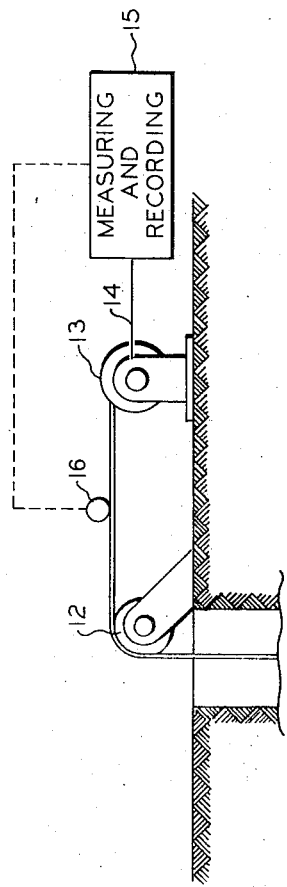
FIG. 1 is a block representation of apparatus constructed in accordance with this invention to survey boreholes.
Figure 1:
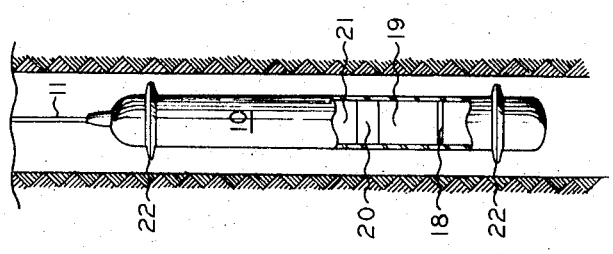

Referring now to the drawing in detail and to FIG. 1 in particular, there is shown an elongated housing 10 which is suspended in a borehole by means of a cable 11. Cable 11 extends over a pulley 12 at the surface and is connected to a drum 13 which can be actuated by a suitable motor, not shown, to raise and lower housing 10 in the borehole. Electrical leads 14 extend between commutator segments on drum 13 to measuring and recording equipment 15. Leads 14 are thus connected to leads which extend through cable 11 to the measuring equipment contained in housing 10. A depth measuring device 16 engages cable 11 and transmits a signal to the recording equipment such that the output signals are recorded as a function of the depth to which housing 10 is lowered.

A source of high energy radiation 18 is carried by housing 10. This source can be a radioactive element which is formed as a ring so that radiation is transmitted outwardly into the surrounding formations. A radiation shield 19 separates source 18 from a detector 20, which advantageously is a scintillation crystal of a material such as sodium iodide. A photomultiplier 21 is positioned immediately adjacent crystal 20. Housing 10 can be provided with centering rings 22 or fingers.

Figure 2:
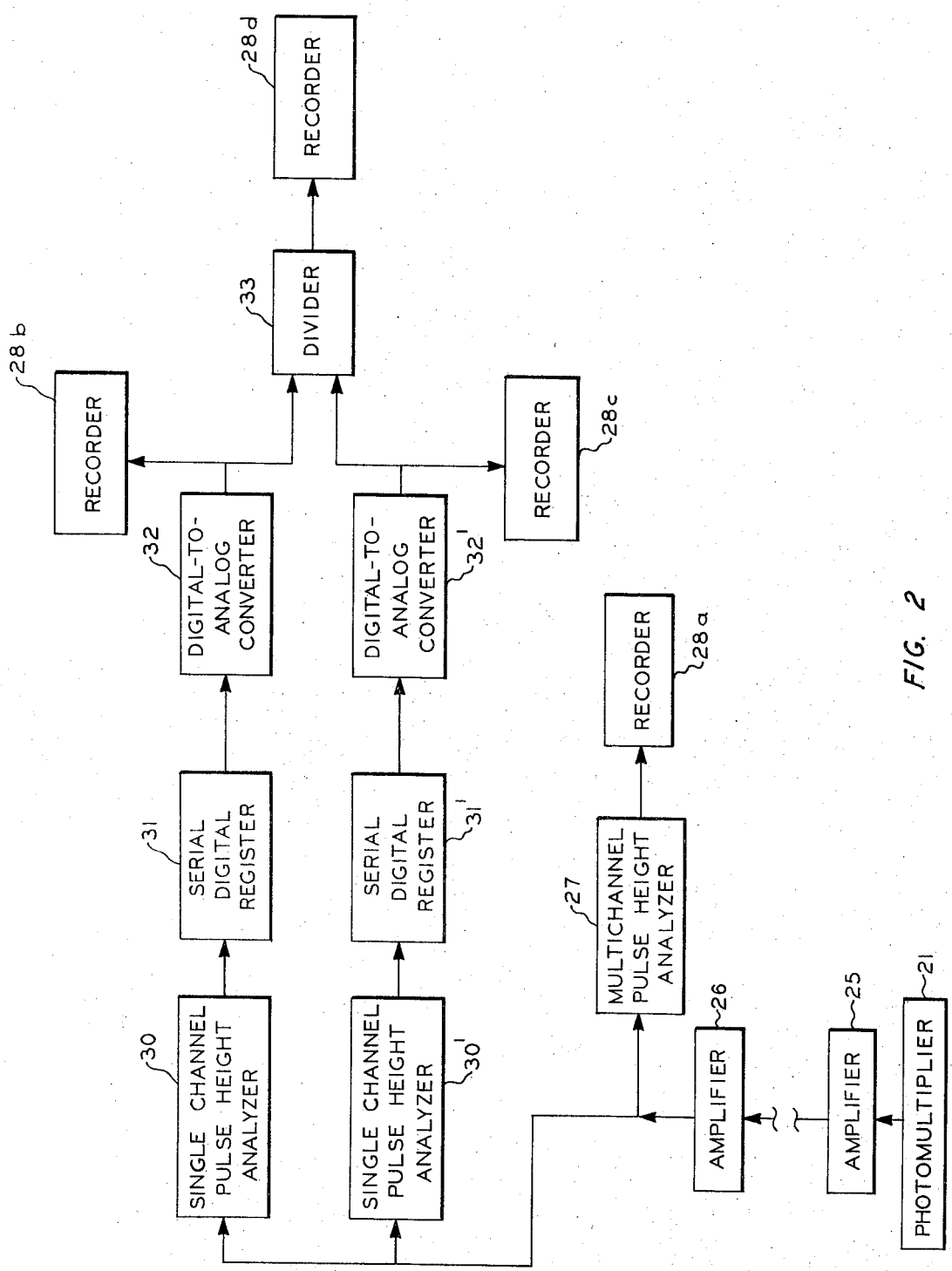
FIG. 2 is a block diagram of the electrical components of the apparatus of FIG. 1.

The electrical components of the apparatus of FIG. 1 are illustrated in block form in FIG. 2. The output signal from photomultiplier 21 is amplified by an amplifier 25 which is contained within housing 10, and the resulting amplified signal is transmitted to the surface equipment. This transmitted signal is amplified by an amplifier 26 at the surface. The output signal from amplifier 26 is transmitted through a multi-channel pulse height analyzer 27 to a recorder 28a. This provides an indication of the spectrum of the radiation received by crystal 20.

A second output signal from amplifier 26 is transmitted through a first single channel pulse height analyzer 30 to a serial digital register 31 which serves as an integrator with respect to signals transmitted through pulse height analyzer 30. A third output signal from amplifier 26 is transmitted through a second single channel pulse height analyzer 30' to a second serial digital register 31'. As will be explained hereinafter in greater detail, the two pulse height analyzers are set to transmit signals of different energy levels in the Compton scattered region. Suitable timing equipment, not shown, can be employed to control the digital registers so that the registers serve to integrate repetitively signals over preselected time intervals. The output signal from register 31 is transmitted through a digital-to-analog converter 32 to a recorder 28b. Similarly, an output signal from register 31' is transmitted through a digital-to-analog converter 32' to a recorder 28c. In addition, the output signals from the two converters are applied to the respective inputs of a signal divider 33. The resulting quotient of the signal from converter 32 divided by the signal from converter 32' is applied to a recorder 28d. The three recorders 28b, 28c and 28d, illustrated in FIG. 2 can be different channels of a single recorder which is connected to depth indicator 16. Recorder 28a is an X-Y recorder used to plot the pulse height (energy) spectra of zones selected (with probe stationary or motion restricted) on the basis of information read from the charts of recorders 28b, 28c and 28d.

Figure 3:
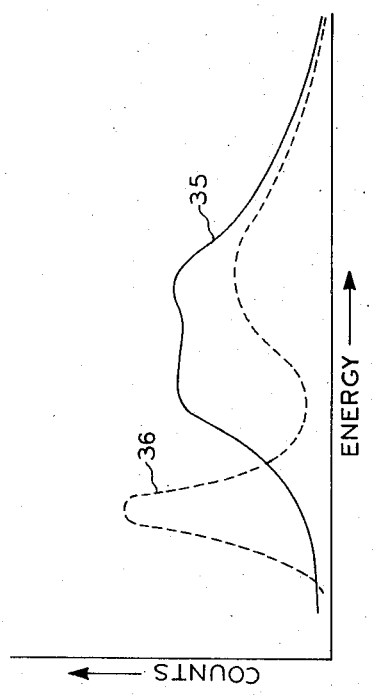
FIG. 3 is a graphical representation of signals obtained from certain measurements.

As illustrated in FIG. 3, a recording of the general configuration of curve 35 is obtained if an output signal from photomultiplier 21 is plotted as a function of the energy of the radiation received. Such a curve can be obtained, for example, by holding housing 10 stationary at a given location and plotting the pulse height spectrum provided by the multichannel analyzer. The resulting curve 35 often has two small peaks in the region of the Compton scattered radiation. Curve 36 of FIG. 3 is representative of the type of signal obtained if a similar plot is made in a formation containing a heavy metal, such as lead. The first peak of curve 36 is representative of the K-line fluorescent radiation emitted by the metal. This radiation is emitted at an energy level below the energy level of the peak of the Compton scattered radiation.

Figure 4:
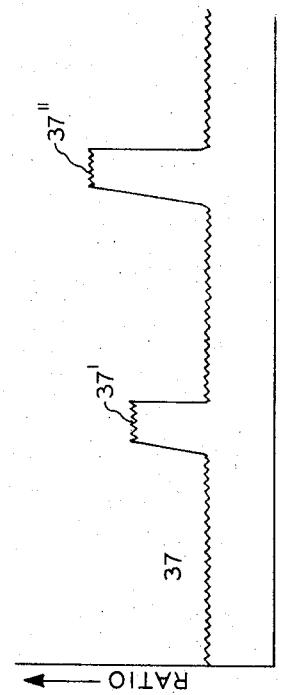
FIG. 4 is a graphical representation of a typical output signal from the apparatus of FIG. 1.

In accordance with the present invention, pulse height analyzers 30 and 30' are set to transmit different energy levels, both of which are in the Compton scattered region. The best results usually are obtained when the two analyzers are set to transmit energies at approximately the levels of the respective peaks of curve 35. These can be at energy levels of 106–116 KeV and 127–133 KeV, for example. This results in a signal of the type illustrated schematically in FIG. 4 being applied to recorder 28d. The ratio signal 37 remains substantially constant in the absence of a metal being present in the surrounding formations. When such a metal is present, however, the curve 37 is displaced, such as shown at regions 37', 37''. Such displacements indicate the presence of one or more metal ores at the indicated depth.

When metal indications are so obtained, a more detailed analysis of the region can then be made to determine the particular metal ore or ores present. This can be accomplished by recording the pulse height spectrum by means of the multichannel analyzer 27 and recorder 28a illustrated in FIG. 2. This provides a plot of the type shown at 36 in FIG. 3 wherein the energy level of the initial peak of each curve is characteristic of the particular metal present. Pulse height is proportional to energy.

When the instrument is to be employed to detect a series of heavy metals, a gamma ray source such as mercury-203 can be employed as source 18. Such a source can be constructed by applying the mercury to a porous ceramic ring. A surrounding steel shield can be used to reduce to a negligible value the undesired 71 KeV thallium X-rays which may be present in such a source and the 279 KeV gamma ray used for excitation. Shield 19 can be fabricated of Mallory 1000 metal, which is mostly tungsten. The 279 KeV gamma ray is above the energy level of X-rays by any metal which may be present in the material being analyzed. For example, uranium emits X-rays at a level of about 97 KeV. The mercury-203 source is particularly useful in the detection of metals heavier than about cadmium. If metals of lower molecular weight are to be detected, a source such as iodine-125 can be used to advantage. Iodine-125 emits energy at a level of 27 KeV. Another useful source is americium-241. Of course, other radiation sources can be employed as long as the radiation emitted is at a sufficiently high energy level that Compton radiation from the test material is at a higher energy level than the characteristic emitted radiation of the metals to be detected. The two pulse height analyzers are generally set at energy levels representative of the respective two peaks of curve 35 of FIG. 3.

The invention has been described in conjunction with the analysis of subterranean formations to detect ore bodies therein. However, the invention is also applicable to the analysis of sample materials brought into a laboratory and to the detection of metals and other elements in regions other than subterranean formations. It should be apparent that any elements which scatter radiation above a cut-off value can be detected.

While this invention has been described in conjunction with presently preferred embodiments, it obviously is not limited thereto.

What is claimed is:

1. The method of detecting the presence of metals in subterranean formations comprising moving through a formation to be analyzed a source of electromagnetic radiation of an energy level greater than the energy level of X-rays emitted by the metals to be detected, moving a radiation detector through the formation adjacent the source but shielded therefrom so as to measure radiation emitted from the formation as a result of the formation being irradiated from the source, establishing a first signal representative of the radiation received by the detector at a first energy level in the region of Compton scattered radiation from the formation, establishing a second signal representative of the radiation received by the detector at a second energy level in the region of Compton scattered radiation from the formation, said two energy levels being approximately the two peak energy levels of scattered radiation from the formation, respectively, whereby a comparison of the two signals provides information regarding the presence of metal ore in the formation.

2. The method of claim 1, further comprising dividing the first signal by the second signal to establish a third signal representative of the ratio of the first signal to the second signal.

3. The method of claim 2, further comprising recording the third signal as a function of the distance the source and detector are moved through the formation.

4. The method of claim 3, further comprising locating the source and detector at a region of the formation where the third signal is indicative of the presence of metal and measuring selectively radiation received at the detector at energy levels below the Compton scattering region to determine which metal ore or ores are present in the formation.

5. The method of claim 1 wherein the source comprises mercury-203.

6. The method of claim 1 wherein the source comprises iodine-125.

7. The method of claim 1 wherein the source is americium-241.

8. The method of detecting the presence of elements in a material which comprises irradiating the material with electromagnetic radiation at an energy level greater than the energy level of X-rays emitted by the elements to be detected, detecting radiation emitted from the material as a result of the irradiation, establishing a first signal representative of the detected radiation at a first energy level in the region of Compton scattered radiation from the material, establishing a second signal representative of the detected radiation at a second energy level in the region of Compton scattered radiation from the material, said two energy levels being approximately the two peak energy levels of scattered radiation from the material, respectively, and establishing a third signal representative of the ratio of the first signal to the second signal.

9. The method of claim 8, further comprising recording a signal representative of the total radiation detected.

* * * * *